(12) United States Patent
Swanson et al.

(10) Patent No.: US 11,188,407 B1
(45) Date of Patent: Nov. 30, 2021

(54) OBTAINING COMPUTER CRASH ANALYSIS DATA

(71) Applicant: Amazon Technologies, Inc., Seattle, WA (US)

(72) Inventors: Robert Charles Swanson, Olympia, WA (US); Troy Lawson Bevis, Seattle, WA (US); Nathan Pritchard, Redmond, WA (US); Christopher James BeSerra, Federal Way, WA (US)

(73) Assignee: Amazon Technologies, Inc., Seattle, WA (US)

( * ) Notice: Subject to any disclaimer, the term of this patent is extended or adjusted under 35 U.S.C. 154(b) by 107 days.

(21) Appl. No.: 16/413,341

(22) Filed: May 15, 2019

(51) Int. Cl.
*G06F 11/00* (2006.01)
*G06F 11/07* (2006.01)
*G06F 11/14* (2006.01)

(52) U.S. Cl.
CPC ........ *G06F 11/0778* (2013.01); *G06F 11/141* (2013.01); *G06F 11/1435* (2013.01); *G06F 11/1469* (2013.01)

(58) Field of Classification Search
CPC .............. G06F 11/141; G06F 11/1435; G06F 11/1469; G06F 11/0721; G06F 11/0778; G06F 11/0776
See application file for complete search history.

(56) References Cited

U.S. PATENT DOCUMENTS

| 8,589,749 B1* | 11/2013 | Yu ................. G01R 31/318597 |
| | | 714/729 |
| 2015/0006962 A1* | 1/2015 | Swanson ............. G06F 11/0724 |
| | | 714/38.11 |
| 2015/0082420 A1* | 3/2015 | Love ................... H04L 63/0823 |
| | | 726/16 |
| 2015/0113242 A1* | 4/2015 | Abrams ............. G06F 12/1458 |
| | | 711/163 |
| 2016/0283663 A1* | 9/2016 | Allen ..................... G06F 3/0683 |
| 2018/0095681 A1* | 4/2018 | Swanson ............. G06F 11/0778 |

* cited by examiner

*Primary Examiner* — Joseph D Manoskey
(74) *Attorney, Agent, or Firm* — Klarquist Sparkman, LLP

(57) ABSTRACT

When a computer boots up, a Basic Input/Output System (BIOS) configures system memory to have a crash memory area within the system address map, which can be used by a processor to dump crash memory data. When an error event occurs, the processor can initiate a dump to the crash memory area. Any desired data can be placed into the crash memory area, but typical data can include a state of registers in the processor. The processor then sets a flag, such as an external pin, indicating that the crash memory data is ready to be read. The flag can be read by a secure processor, which then reads the crash memory area at normal memory access speeds using the system bus. For example, the secure processor can access the crash memory area using Direct Memory Access (DMA) reads over a PCIe system bus.

20 Claims, 8 Drawing Sheets

OBTAINING COMPUTER CRASH ANALYSIS DATA

BACKGROUND

Computer crashes are well-known to occur and can cause a system reset. Resets allow any pending errors to be cleared and allow the computer to be brought back to an initialized state. When a computer crashes, it is desirable to obtain crash analysis data (sometimes called a crash dump) that can be analyzed to determine why the reset occurred. Resets can occur for a variety of reasons including the following: crash dump data is missing, a kernel crash occurred, a processor error occurred, etc.

Obtaining crash dump data can be a slow process. The process can also have security gaps, potentially allowing malicious actors to obtain information about instructions that were performed by the processor or requests made to an operating system from an application.

Therefore, it is desirable to efficiently obtain crash analysis data. It can also be desirable to obtain the data with a high level of security.

DETAILED DESCRIPTION

At startup, a Basic Input/Output System (BIOS) can configure system memory to have a crash memory area within a system address map. The crash memory area can be used by a processor to dump crash memory data when an error condition occurs, such as a dirty reset (i.e., an unintended reset). The crash memory area can be in a separate Random Access Memory (RAM) or in RAM on the processor. In other embodiments, the crash memory area can be memory mapped I/O. In some embodiments, the BIOS can save a variety of information to be included in any crash dump. For example, the BIOS can store configuration parameters programmed into the processor into the crash memory area. The BIOS can further store training parameters of the system memory and bus link training information into the crash memory area to further supplement the crash dump. When an error event occurs, the processor can initiate a dump to the crash memory area. Any desired data can be placed into the crash memory area, but typical data can include a state of registers in the processor. Some example registers can include configuration space registers, machine check banks, error information, and a table of requests (TOR)(e.g., operating system requests).

The processor can then set a flag, such as an external pin, indicating that the crash memory data is ready to be read. The flag can be read by a secure processor (such as a Baseboard Management Controller), which can then read the crash memory area at normal memory access speeds using the system bus. For example, the secure processor can access the crash memory area using Direct Memory Access (DMA) reads over a PCIe system bus. In some embodiments, the memory mapped I/O can be in the secure processor itself, such that the processor stores the crash memory data directly into the secure processor. This provides the advantage that the secure processor immediately has the crash data and does not need to retrieve it.

Prior solutions used a dedicated bus (i.e., a PECI bus) to extract crash data from a CPU. The PECI interface is slow, with speeds ranging from 256 KB/s to 1 MB/s. Additionally, the CPU memory is limited in terms of its crash size. Obtaining the crash log from the CPU through the PECI bus can take 4-16 minutes.

Figure 1:
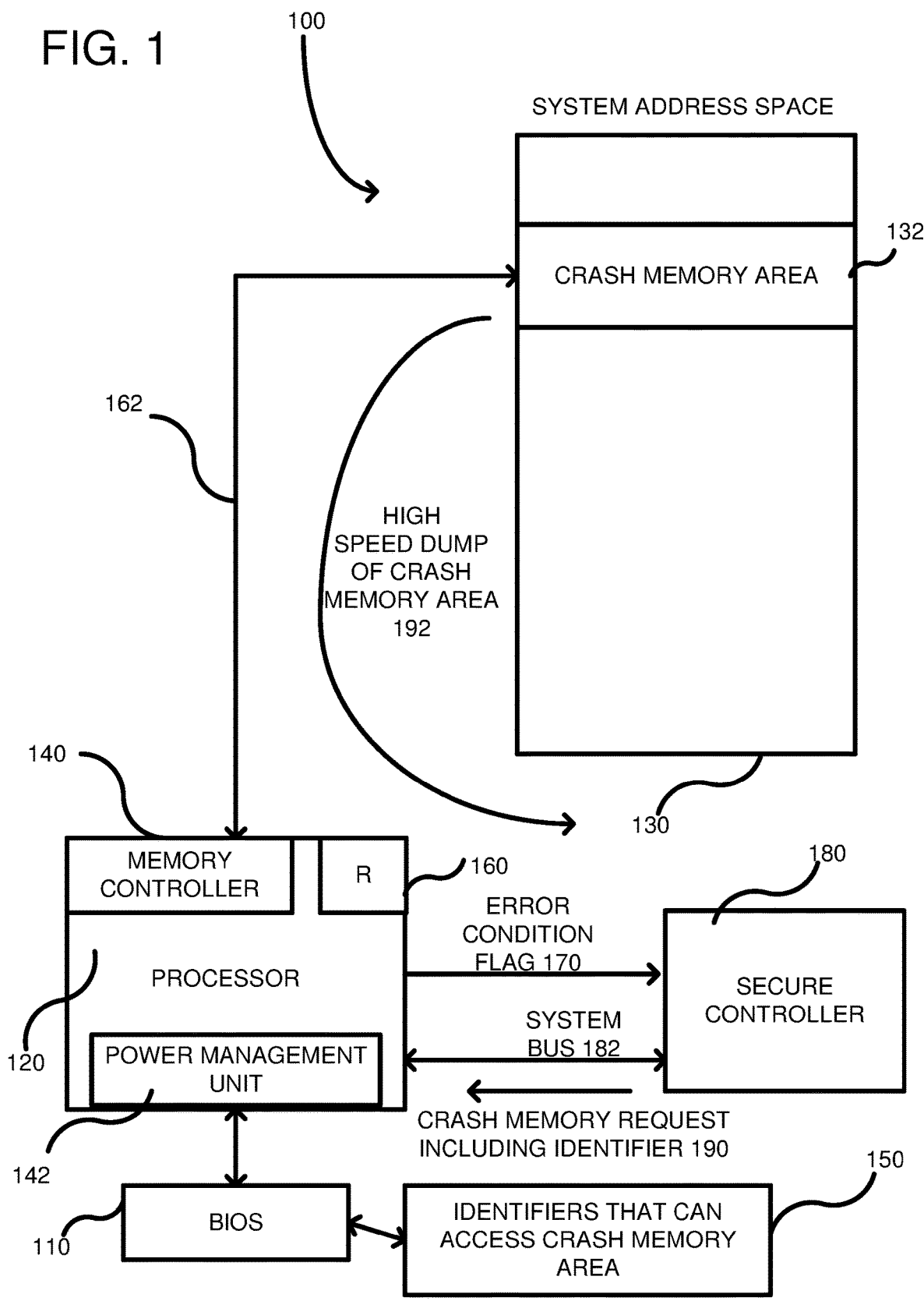
FIG. 1 is an embodiment of a system wherein a crash memory area is allocated in a system address space, and is retrievable by a secure controller through a system bus.

FIG. 1 shows an example system 100 used for obtaining error data from a computer device, such as a server computer. When the system 100 is rebooted, a BIOS 110 can be used to initialize the system 100. For example, the BIOS 110 can configure a processor 120 by programming configuration parameters into the processor. The processor 120 can be a general-purpose central processing unit (CPU), a processor in an application-specific integrated circuit (ASIC) or any other type of processor. The BIOS 110 can also set up a system address space 130, including establishing a crash memory area 132. The system address space can include Random Access Memory (RAM) and memory mapped I/O. The crash memory area 132 is an area where the processor 120 can dump data when an error condition is encountered. The error condition can be any of a variety of system errors including, but not limited to, missing a crash dump, detecting a kernel crash, detecting a memory error, and detecting a processor malfunction. The error data is typically related to registers stored within the processor 120, such as configuration registers, a table of requests, and machined check banks. The crash memory area 132 can be any desired size, which is programmable by the BIOS.

Access to the crash memory area 132 can be controlled through a memory controller 140, which is shown integrated into the processor 120, but can be separated therefrom. The processor 120 can further include a power management unit 142, which can monitor the health of the processor 120 from both a power and performance perspective. During the boot process, the BIOS 110 can read identifiers 150 of elements that can access the crash memory area 132 after a crash. For example, the identifiers 150 can be attributes (e.g., addresses) associated with the components within the system 100 that are able to retrieve data from the crash memory area 132. The identifiers 150 can be programmed by the BIOS 110 into the processor 120 for use by the memory controller 140. Example components that can access the crash memory area include the BIOS 110, a secure controller 180, and the processor 120.

When the processor 120 detects an error, it can access state information from registers, shown generally at 160. The state information can then be copied to the crash memory area 132 via the bus 162. The copying operation can be controlled by the power management unit 142, which is given control to perform such operations following an interrupt due to the error condition. Once the processor 120 has completed its dump to the crash memory area 132, it can set a flag, such as an error condition flag 170, which can be an external pin on the processor 120. Such an operation can be performed by the power control unit 142. In response to detecting the error condition flag 170, the secure controller 180 can use a system bus 182 to transmit a request 190, which includes an identifier of the secure controller 180. The identifier can be any number of identifiers including a Globally Unique Identifier (GUID), a simple address, or any other type of desired identifier. The system bus can be a computer bus that connects the major components in the computer system and combines a data bus with an address bus. Example buses include a PCIe bus that couples various components to system memory. Once the request 190 is received, the memory controller 140 within the processor 120 can compare the identifier associated with the request to stored identifiers 150 provided by the BIOS. If there is a match, then the memory controller 140 provides access to the crash memory area 132 for the secure controller 180. However, when the flag 170 is set, the memory controller 140 can restrict access to other memory locations within the address space 130. Example components that can access the crash memory area include the BIOS 110, the processor 120, and the secure controller 180. Thus, security is provided through the programmed identifiers 150 limiting access to only the crash memory area 132. Assuming the identifiers are validated, the memory controller 140 allows the secure controller 180 to perform a high-speed dump of the crash memory area 132 over the system bus 182 as indicated by arrow 192. The bus 182 can be any desired system bus, such as a PCIe bus and can be the same bus as bus 162. Once the data is received by the secure controller 180, it can be offloaded to a different server computer (described further below). By being in the system address space 130, the crash memory area 132 can be accessed at a same speed as other memory accesses, such as accesses using DMA.

In embodiments where the crash memory area 132 is a memory mapped I/O, the processor 120 can store crash data directly within a memory in the secure controller.

Figure 2:
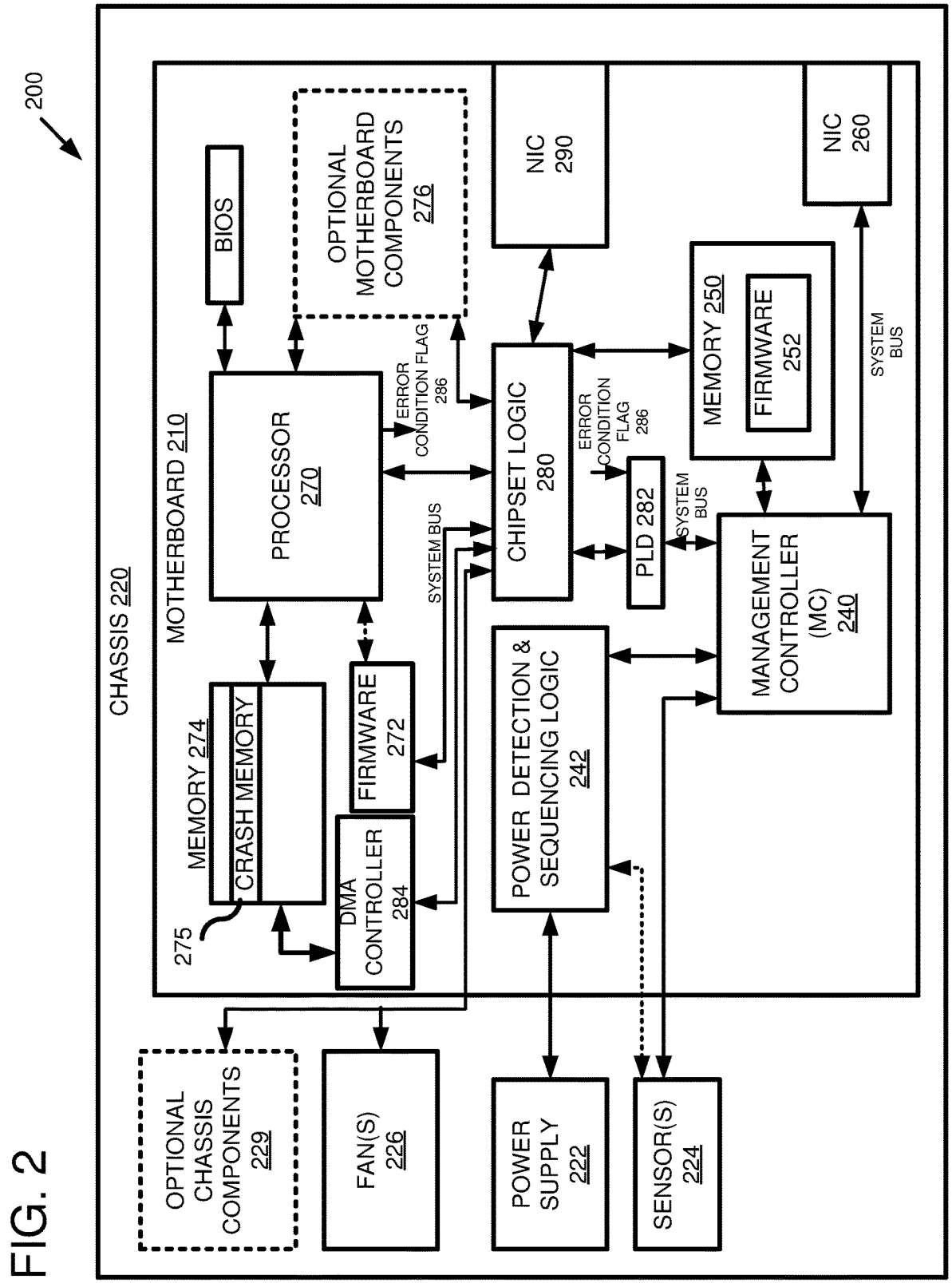
FIG. 2 is an embodiment of a server computer including the crash memory area in a memory of a server computer.

FIG. 2 is a system diagram showing an example of a computing system 200 including a motherboard 210 and a chassis 220. The chassis 220 can include a power supply 222, one or more sensors 224, one or more fans 226, and optional chassis components 229. The motherboard 210 can include a set of components that are common across multiple computing systems so that the motherboard 210 can be used in multiple different computing systems. The motherboard 210 and additional components, such as optional motherboard components 276, can be installed within the chassis 220. By using different components from within a set of optional motherboard components 276, different types of computing systems can be customized according to a bill of materials for each type of computing system. For example, the components selected for the optional motherboard components 276 can be selected to correspond to a bill of materials for the computing system 200.

The computing system 200 can be connected to other components of a datacenter and power can be applied, such as by connecting the computing system 200 to an AC power source and/or toggling a power switch (not shown) of the chassis 220. The power supply 222 can convert energy from an alternating current to direct current energy that can be used to power the components of the chassis 220 and the motherboard 210. The power supply 222 can have multiple outputs that can controlled independently of each other. The outputs of the power supply 222 can be at different voltages and/or connected to different components within the computing system 200. For example, different outputs of the power supply can be sequenced so that some components of the computing system 200 are powered on before other components of the computing system 200.

Power detection and sequencing logic 242 can be used to detect when the power supply outputs are within stable operating parameters. For example, after the power is initially switched on, it can take time for one or more of the power supply outputs to ramp to an appropriate output voltage. The power detection and sequencing logic 242 can sense the voltage of the power supply outputs and can indicate when the voltage is within operational parameters (such as within +/−10% of a predefined voltage). Additionally, or alternatively, the voltage sensors can be integrated within the power supply 222 or on the chassis (e.g., sensors 224) and the voltage sensors can communicate with the power detection and sequencing logic 242. When a power supply output transitions to an operational state, the power detection and sequencing logic 242 can perform a power-up sequence and/or a reset sequence. For example, power can be applied to one portion of the motherboard before other portions of the motherboard. As another example, one portion of the motherboard can be placed in or taken out of reset at a different time than a different portion of the motherboard. As a specific example, a management controller 240 and its associated components can be brought out of reset (e.g., a reset signal connected to the management controller 240 can be deasserted) before a host CPU (such as processor 270). The management controller can be a Baseboard Management Controller (BMC) in some embodiments.

The management controller 240 can initialize configuration software based on a received signature. For example, the management controller 240 can execute initialization software stored in memory 250. The initialization software can retrieve or load configuration software that is specific to a type of computing system that is identified by a received signature. For example, a NIC 260 can be used to communicate with devices (such as server computers) connected to a management network. The configuration software modules can be downloaded from a server computer attached to the management network connected to the NIC 260. As another example, the configuration software can be read from a storage device (not shown) of the computing system 200 and loaded into the memory 250.

The retrieved configuration software can be stored in non-volatile memory that is directly or indirectly accessible by the management controller 240 and/or the processor 270. For example, the configuration software can be software modules that are stored in firmware 252 and/or firmware 272. The firmware 252 and 272 can be used to control one or more components integrated with or controlled by the motherboard (such as components of the chassis 220). For example, the firmware 272 can include fan control software which, when executed by the processor 270, can be used to control the operation of one or more fans 226 within the chassis 220. The firmware 252 or 272 can include BIOS that can be used to program parameters within the processor 270. Moreover, the BIOS can be used to establish a memory map in a memory 274. The memory map can include a section of the memory 274, which is a crash memory area 275, reserved so that the processor 270 can store crash data in an external memory that is accessible to other components, such as the management controller 240. Once the power detection and sequencing logic 242 determines that power is up, it can initiate a startup operation. During startup of the computing system 200, the firmware 272 can configure the processor 270 and store training data into the crash memory area 275, such as how the processor was configured (e.g., I-diagrams), PCIe link training, etc. A programmable logic device (PLD) 282 can be positioned between the chipset logic 280 and the management controller 240. The PLD 282 can encompass any variety of logic devices, such as an application specific integrated circuit (ASIC), a field programmable gate array (FPGA), a processor or microprocessor, or any other form of configurable digital logic hardware or software, etc. A Direct Memory Access (DMA) controller 284 can be positioned between the memory 274 and the chipset logic 280 and allow access to the memory 274 without passing through the processor 270.

The management controller 240 can communicate with the processor 270 and other motherboard components via the chipset logic 280. The chipset logic 280 can be used to manage communications between the processor 270 and other components of the motherboard 210 and the chassis 220. For example, the chipset logic 280 can include one or more bridges for converting between different signaling protocols. As a specific example, the processor 270 can communicate with the chipset logic 280 using a high-speed front-side bus and the NIC 290 can communicate with the chipset logic 280 using an input/output (IO) protocol, such as peripheral component interconnect (PCI), or PCI-Express. The chipset logic 280 can convert between and manage communications between the different protocols so that the processor 270 can communicate with the NIC 290 through the chipset logic 280.

The processor 270 and the management controller 240 can operate using a distributed computing model, where the processor 270 and the management controller 240 each have private memory and they can communicate by passing messages to each other. The processor 270 and the management controller 240 can have one or more areas of shared memory where messages and/or data can be passed by writing to the shared memory. Generally, the processor 270 and the management controller 240 have private areas of memory and can execute different programs, such as different operating systems. For example, the processor 270 can execute programs that are resident in memory 274 and/or firmware 272 and the management controller can execute programs that are resident in memory 250.

The processor 270 can be powered on and/or reset at a different time than the management controller 240. For example, the management controller 240 can be powered on and/or brought out of reset before the processor 270. As one example, the management controller 240 can update the firmware 272 and/or other configuration software used by the processor 270 while the processor 270 is powered down and/or in a reset state. As another example, the management controller 240 can read and/or download configuration software and/or settings before the processor 270 is brought out of reset. The configuration software and/or settings can be provided to a BIOS routine executing on the processor 270 after the processor 270 is brought out of reset.

The processor 270 and the management controller 240 can communicate over independent networks. For example, the management controller 240 can communicate primarily over a management network using the NIC 260 and the processor 270 can communicate primarily over a production network using the NIC 290. The NICs 260 and 290 can have different MAC addresses and can be cabled to different routers. By providing a capability to communicate over multiple networks, redundant communication channels can be provided, and management activities can be communicated over a management plane and communications associated with computing services can be communicated over a data plane that is separate from the management plane.

When the processor 270 detects an error condition, it can set the error condition flag 286, which can, in this embodiment, be read by the PLD 282. The PLD, in turn, can enable requests from the management controller 240 through the DMA controller 284. In this way, the management controller 240 can read the crash memory area 275 using the DMA controller 284 and the system bus, just as other sections of memory 274 are read during normal operation. The management controller 240 can then transmit the crash data through the NIC 260 to an external server computer. In some embodiments, the error condition can initiate an interrupt in the processor 270, which causes the processor to enter a system management mode. The system management mode can give control to the firmware (BIOS) 272, which can decide to provide limited access to the memory 274. For example, the firmware 272 can block all access to the memory 274 except access by the processor 270, the BIOS itself, and the management controller 240. In some cases, the BIOS can ensure that the processor 270, the BIOS and the management controller 240 can only access the crash memory 275 and other memory areas are restricted. Such control over the management controller 240 can occur through the BIOS configuring the PLD 282. The BIOS can further ensure that all other components are blocked from the memory 274 altogether through manipulation of the DMA controller 284 or the processor 270. Such control provides a high level of security of the crash data to protect it from potential hackers. Additionally, other memory areas are protected during the error handling.

Figure 3:
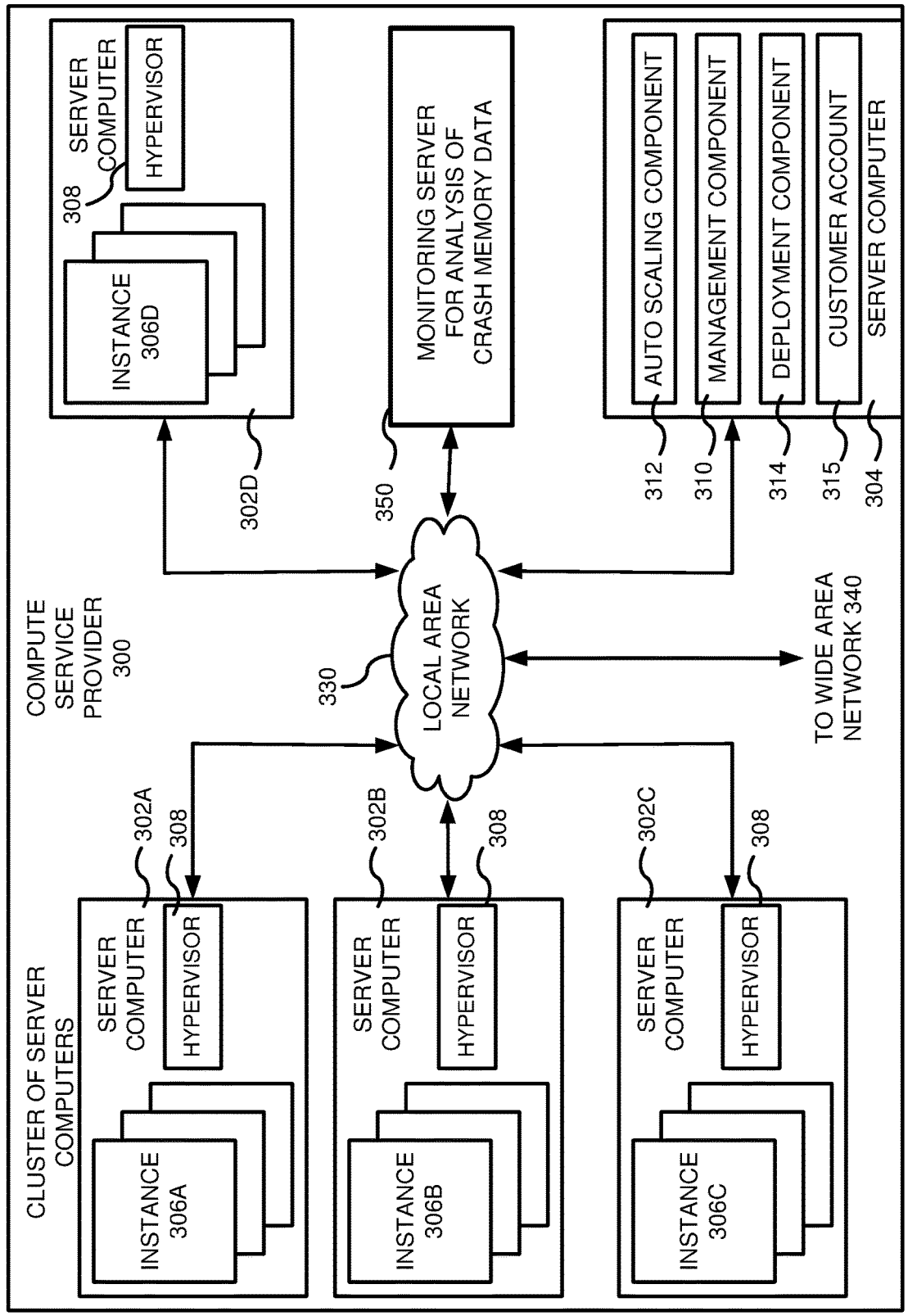
FIG. 3 is an example system diagram showing a plurality of virtual machine instances running in the multi-tenant environment including a server computer for analyzing data from the crash memory area of FIGS. 1 and/or 2.

FIG. 3 is a computing system diagram of a network-based compute service provider 300 that illustrates one environment in which embodiments described herein can be used. By way of background, the compute service provider 300 (i.e., the cloud provider) is capable of delivery of computing and storage capacity as a service to a community of end recipients. In an example embodiment, the compute service provider can be established for an organization by or on behalf of the organization. That is, the compute service provider 300 may offer a "private cloud environment." In another embodiment, the compute service provider 300 supports a multi-tenant environment, wherein a plurality of customers operate independently (e.g., a public cloud environment). Generally speaking, the compute service provider 300 can provide the following models: Infrastructure as a Service ("IaaS"), Platform as a Service ("PaaS"), and/or Software as a Service ("SaaS"). Other models can be provided. For the IaaS model, the compute service provider 300 can offer computers as physical or virtual machines and other resources. The virtual machines can be run as guests by a hypervisor, as described further below. The PaaS model delivers a computing platform that can include an operating system, programming language execution environment, database, and web server. Application developers can develop and run their software solutions on the compute service provider platform without the cost of buying and managing the underlying hardware and software. The SaaS model allows installation and operation of application software in the compute service provider. In some embodiments, end users access the compute service provider 300 using networked client devices, such as desktop computers, laptops, tablets, smartphones, etc. running web browsers or other lightweight client applications. Those skilled in the art will recognize that the compute service provider 300 can be described as a "cloud" environment.

The particular illustrated compute service provider 300 includes a plurality of server computers 302A-302D. While only four server computers are shown, any number can be used, and large centers can include thousands of server computers. The server computers 302A-302D can provide computing resources for executing software instances 306A-306D. In one embodiment, the instances 306A-306D are virtual machines. As known in the art, a virtual machine is an instance of a software implementation of a machine (i.e. a computer) that executes applications like a physical machine. In the example of virtual machine, each of the servers 302A-302D can be configured to execute a hypervisor 308 or another type of program configured to enable the execution of multiple instances 306 on a single server. Additionally, each of the instances 306 can be configured to execute one or more applications.

It should be appreciated that although the embodiments disclosed herein are described primarily in the context of virtual machines, other types of instances can be utilized with the concepts and technologies disclosed herein. For instance, the technologies disclosed herein can be utilized with storage resources, data communications resources, and with other types of computing resources. The embodiments disclosed herein might also execute all or a portion of an application directly on a computer system without utilizing virtual machine instances.

One or more server computers 304 can be reserved for executing software components for managing the operation of the server computers 302 and the instances 306. For example, the server computer 304 can execute a management component 310. A customer can access the management component 310 to configure various aspects of the operation of the instances 306 purchased by the customer. For example, the customer can purchase, rent or lease instances and make changes to the configuration of the instances. The customer can also specify settings regarding how the purchased instances are to be scaled in response to demand. The management component can further include a policy document to implement customer policies. An auto scaling component 312 can scale the instances 306 based upon rules defined by the customer. In one embodiment, the auto scaling component 312 allows a customer to specify scale-up rules for use in determining when new instances should be instantiated and scale-down rules for use in determining when existing instances should be terminated. The auto scaling component 312 can consist of a number of subcomponents executing on different server computers 302 or other computing devices. The auto scaling component 312 can monitor available computing resources over an internal management network and modify resources available based on need.

A deployment component 314 can be used to assist customers in the deployment of new instances 306 of computing resources. The deployment component can have access to account information associated with the instances, such as who is the owner of the account, credit card information, country of the owner, etc. The deployment component 314 can receive a configuration from a customer that includes data describing how new instances 306 should be configured. For example, the configuration can specify one or more applications to be installed in new instances 306, provide scripts and/or other types of code to be executed for configuring new instances 306, provide cache logic specifying how an application cache should be prepared, and other types of information. The deployment component 314 can utilize the customer-provided configuration and cache logic to configure, prime, and launch new instances 306. The configuration, cache logic, and other information may be specified by a customer using the management component 310 or by providing this information directly to the deployment component 314. The instance manager can be considered part of the deployment component.

Customer account information 315 can include any desired information associated with a customer of the multi-tenant environment. For example, the customer account information can include a unique identifier for a customer, a customer address, billing information, licensing information, customization parameters for launching instances, scheduling information, auto-scaling parameters, previous IP addresses used to access the account, etc.

A network 330 can be utilized to interconnect the server computers 302A-302D and the server computer 304. The network 330 can be a local area network (LAN) and can be connected to a Wide Area Network (WAN) 340 so that end users can access the compute service provider 300. It should be appreciated that the network topology illustrated in FIG. 3 has been simplified and that many more networks and networking devices can be utilized to interconnect the various computing systems disclosed herein.

The server computers 302A-302D can be similar to the computing system 200 of FIG. 2. Thus, the server computers 302A-302D can include a crash memory area (e.g., 275 in FIG. 2) and a management controller 240. A monitoring server 350 can obtain data from the crash memory area of each of the server computers for performing analysis on the data. For example, the monitoring server 350 can obtain the data via the management controllers on each server computer. Once the data is received, analysis can be performed to determine why the server computers crashed so that corrective action can be taken.

Figure 4:
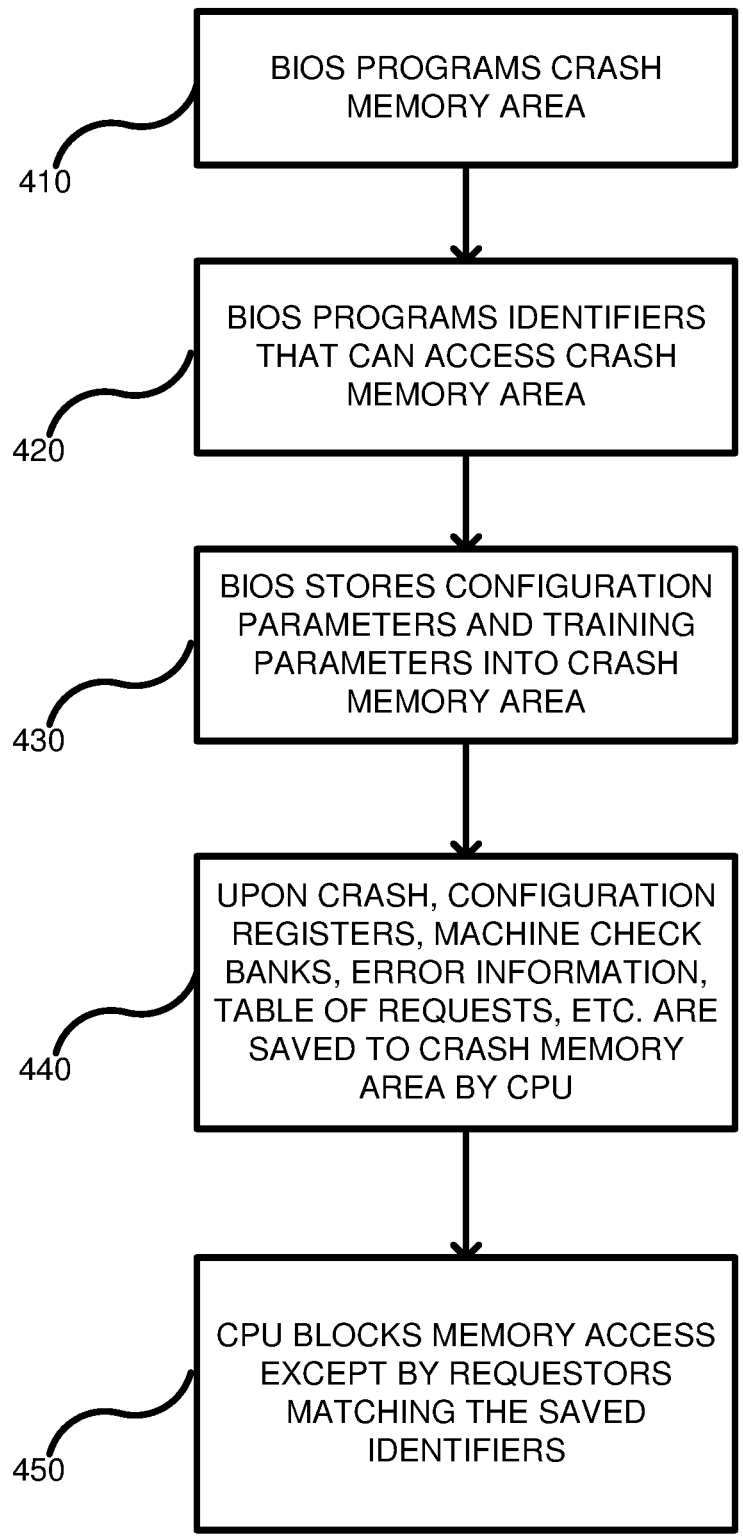
FIG. 4 is a flowchart according to one embodiment for establishing and writing to a crash memory area.

FIG. 4 is a flowchart according to one embodiment for obtaining error data from a server computer. In process block 410, a BIOS can program a crash memory area in a system memory as part of the memory map. For example, the BIOS can determine a proper memory dump size, which can be CPU dependent or based on stored parameters. Turning to FIG. 1, as an example, the crash memory area is shown at 132 and can be any desired size based on the amount of data and types of parameters to store. In process block 420, the BIOS programs identifiers of components that can access the crash memory area. For example, the identifiers can be an address or other type of identifier associated with a component making a request for access to the system memory. FIG. 1 shows the identifiers 150 that can be programmed by the BIOS 110 into the processor 120. The memory controller 140 can use the identifiers to limit access to the crash memory area 132 to only requests including the appropriate identifiers. For example, a secure controller 180 can make a request 190 including an appropriate identifier matching one of the identifiers 150. If the identifier is matched, the memory controller 140 can allow the secure controller 180 to access the crash memory area 132 at normal system bus speed. On the other hand, identifiers that do not match result in the requests being blocked from accessing memory. In process block 430, the BIOS stores configuration parameters and training parameters into the crash memory area. For example, in FIG. 1, the BIOS 110 can program the processor 120 with configuration parameters and training parameters, which it may then store in the crash memory area 132. In process block 440, when that a crash occurs, the processor stores a variety of parameters to the crash memory area. Example parameters can include configuration registers, machine check banks, error information, table of requests (TOR), etc. Such parameters are shown generally at 160 in FIG. 1. In process block 450, the processor blocks memory access except by requesters matching the saved identifiers. Such requesters can be used to access only the crash memory area and are restricted from accessing other memory areas. Components making requests that do not include the appropriate identifiers can be entirely blocked from accessing system memory during the error condition.

Figure 5:
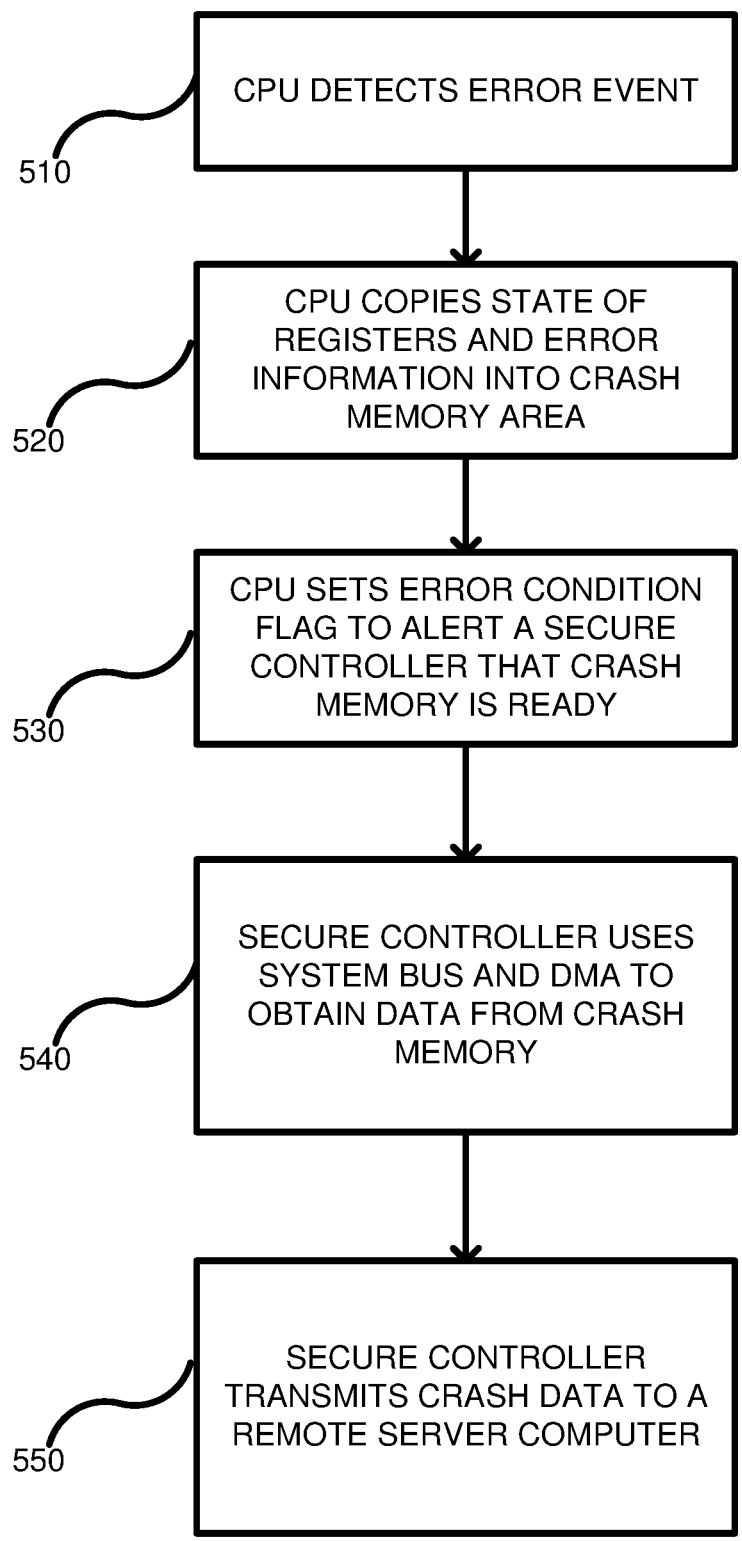
FIG. 5 is a flowchart according to another embodiment for reading a crash memory area.

FIG. 5 is a flowchart according to another embodiment to obtain error data from a server computer. In process block 510, a processor detects an error event. The error event can be a detection that a dirty reset is to occur (i.e., an unintended reset). Dirty resets can occur for a variety of reasons such as missing a crash dump, a kernel crash, a rack failure, a memory failure or a processor failure. In process block 520, the processor copies a state of registers and error information into a crash memory area. For example, in FIG. 2, the processor 270 can copy internal registers to the crash memory area 275. In process block 530, the processor sets an error condition flag to alert a secure controller that the crash memory area is ready to read. For example, in FIG. 2, the error condition flag 286 can be a pin on the processor 270 that is received in the PLD 282, which allows access to the crash memory area 275 by the management controller 240. Although not shown in FIG. 2, the error condition flag 286 can also be received by the management controller 240 to alert it that crash processing should commence. In process block 540, a secure controller uses the system bus and a DMA controller to obtain data from the crash memory area. For example, in FIG. 2, the management controller 240 can access the crash memory area 275 via the DMA controller 284 over the PCIe bus. In the case that the crash memory area is in memory mapped I/O, process block 540 is not needed as the crash data can be loaded directly by the processor into the secure controller's memory. In process block 550, the secure controller can then transmit the crash data to a remote server computer. For example, in FIG. 2, the management controller 240 can transmit the data over the NIC 260 to a remote server computer, such as computer 350 in FIG. 3.

Figure 6:
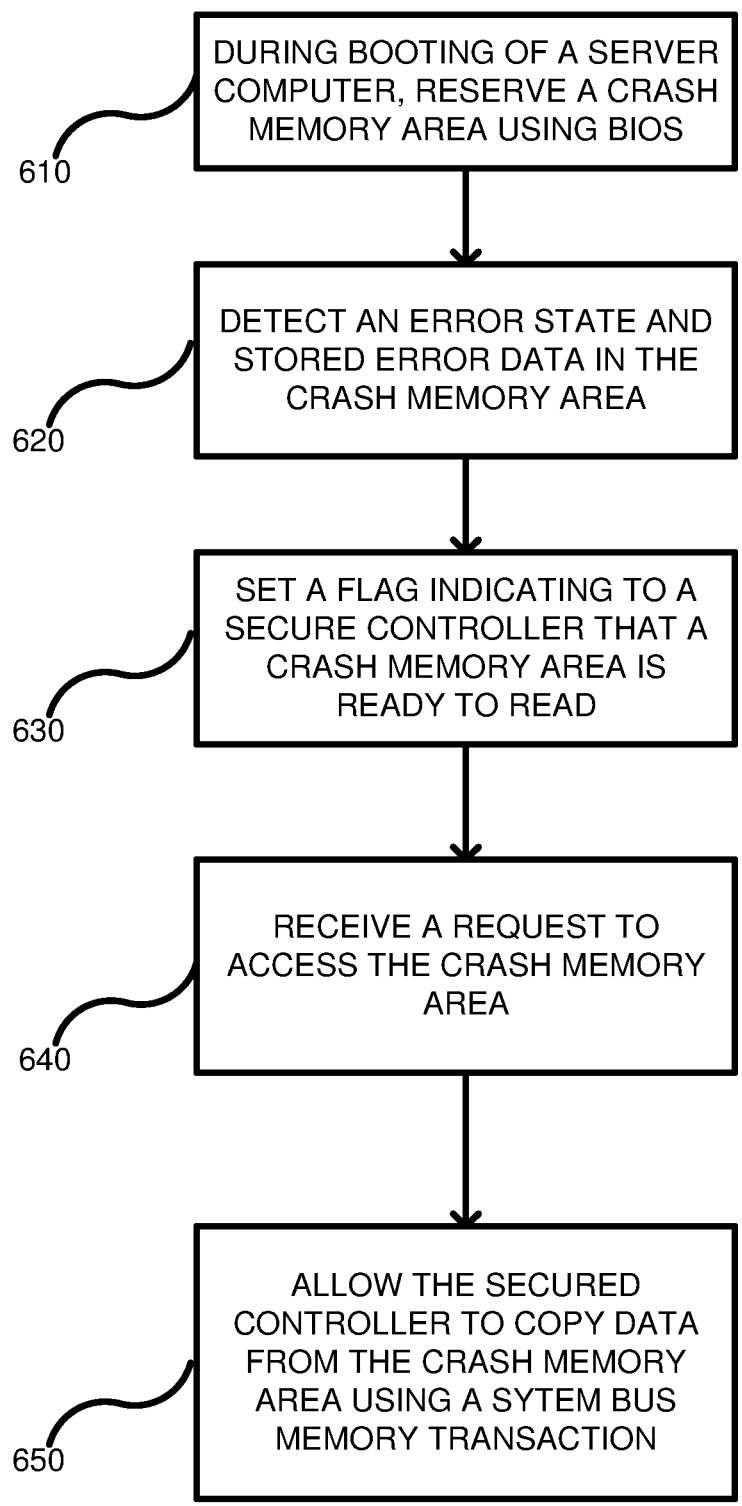
FIG. 6 is a flowchart according to another embodiment for reading a crash memory area.

FIG. 6 is a flowchart of a method according to another embodiment for obtaining error data from a server computer. In process block 610, during booting of a server computer an area is reserved in memory using BIOS, wherein the area is a crash memory area for storing error data. For example, in FIG. 1, the crash memory area 132 can be reserved in the system address space 130. In process block 620, an error state is detected and error data is stored in the crash memory area. For example, in FIG. 1, the processor 120 can gather error data, such as is stored in registers 160, and push the error data to the crash memory area 132. The error state can be detected by the processor through an interrupt procedure resulting from a dirty reset. In process block 630, the processor can set a flag indicating to a secure controller that the crash memory area is ready to be read. For example, the flag can be an error condition flag 170 shown in FIG. 1. The error condition flag can be a hardware bit, such as a processor pin, or can be a software message, possibly including an error code, sent by the processor. In process block 640, a request is received to access the crash memory area. For example, in FIG. 1, the request can be received by the processor 120 from a secure controller 180 as shown by request 190. Alternatively, the request can be through a DMA controller, such as was shown in FIG. 2. In process block 650, the secured controller is allowed access to the crash memory area to using a system bus memory transaction. For example, in FIG. 1, the crash memory area 132 can be accessed by the secure controller via the memory controller 140 over the system bus 182.

Figure 7:
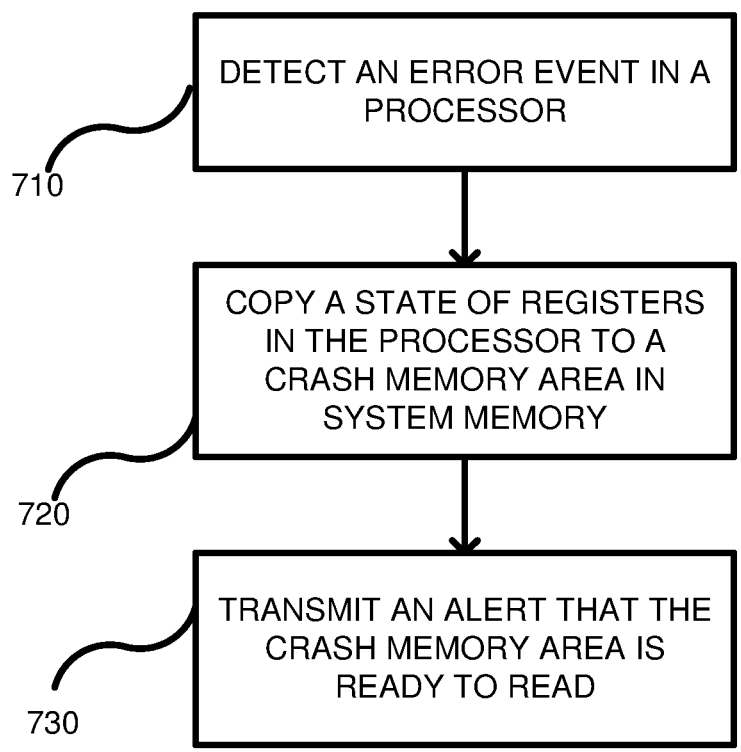
FIG. 7 is a flowchart according to yet another embodiment for reading a crash memory area.

FIG. 7 is a flowchart of a method according to another embodiment. In process block 710, an error event is detected in a processor. For example, in FIG. 1, the processor 120 can have an interrupt routine that is initiated when an error occurs, such as a reset request for the system 100. In process block 720, a state of the registers in the processor are copied to a crash memory area in system memory. Returning to FIG. 1, the registers 160 can include a variety of configuration registers associated with a configuration of the processor, machine check banks, requests made by an operating system, and other error information. The power management unit 142 can copy the registers 160 to the crash memory area 132. In process block 730, the alert is transmitted once the crash memory area is ready to read. For example, in FIG. 1, the processor can activate a flag 170 to indicate to other components in the system that the crash memory area is available for copying. As previously described, the memory controller 140 in the processor may further restrict which components may access the crash memory area 132.

Figure 8:
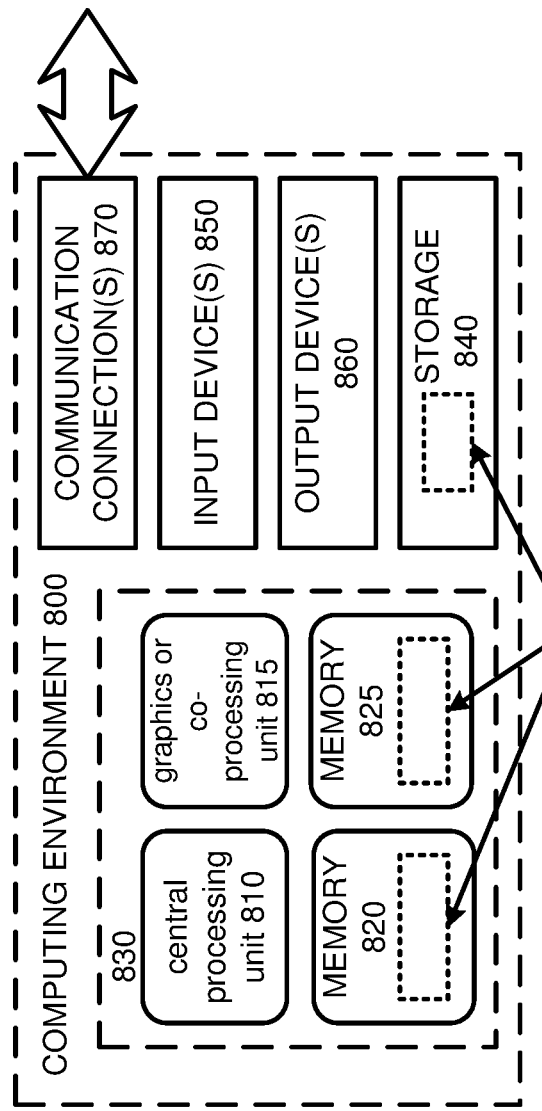
FIG. 8 depicts a generalized example of a suitable computing environment in which the described innovations may be implemented.

FIG. 8 depicts a generalized example of a suitable computing environment 800 in which the described innovations may be implemented. The computing environment 800 is not intended to suggest any limitation as to scope of use or functionality, as the innovations may be implemented in diverse general-purpose or special-purpose computing systems. For example, the computing environment 800 can be any of a variety of computing devices (e.g., desktop computer, laptop computer, server computer, tablet computer, etc.).

With reference to FIG. 8, the computing environment 800 includes one or more processing units 810, 815 and memory 820, 825. In FIG. 8, this basic configuration 830 is included within a dashed line. The processing units 810, 815 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 8 shows a central processing unit 810 as well as a graphics processing unit or co-processing unit 815. The tangible memory 820, 825 may be volatile memory (e.g., registers, cache, RAM), non-volatile memory (e.g., ROM, EEPROM, flash memory, etc.), or some combination of the two, accessible by the processing unit(s). The memory 820, 825 stores software 880 implementing one or more innovations described herein, in the form of computer-executable instructions suitable for execution by the processing unit(s). For example, the memory 820, 825 can store the BIOS 110 from FIG. 1.

A computing system may have additional features. For example, the computing environment 800 includes storage 840, one or more input devices 850, one or more output devices 860, and one or more communication connections 870. An interconnection mechanism (not shown) such as a bus, controller, or network interconnects the components of the computing environment 800. Typically, operating system software (not shown) provides an operating environment for other software executing in the computing environment 800, and coordinates activities of the components of the computing environment 800.

The tangible storage 840 may be removable or non-removable, and includes magnetic disks, magnetic tapes or cassettes, CD-ROMs, DVDs, or any other medium which can be used to store information in a non-transitory way and which can be accessed within the computing environment 800. The storage 840 stores instructions for the software 880 implementing one or more innovations described herein.

The input device(s) 850 may be a touch input device such as a keyboard, mouse, pen, or trackball, a voice input device, a scanning device, or another device that provides input to the computing environment 800. The output device(s) 860 may be a display, printer, speaker, CD-writer, or another device that provides output from the computing environment 800.

The communication connection(s) 870 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., one or more optical media discs, volatile memory components (such as DRAM or SRAM), or non-volatile memory components (such as flash memory or hard drives)) and executed on a computer (e.g., any commercially available computer, including smart phones or other mobile devices that include computing hardware). The term computer-readable storage media does not include communication connections, such as signals and carrier waves. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, aspects of the disclosed technology can be implemented by software written in C++, Java, Perl, any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Program-specific Integrated Circuits (ASICs), Program-specific Standard Products (AS SPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles of the disclosed invention may be applied, it should be recognized that the illustrated embodiments are only examples of the invention and should not be taken as limiting the scope of the invention. We therefore claim as our invention all that comes within the scope of these claims.

What is claimed is:

1. A method of obtaining error data from a server computer, the method comprising:
    during booting of the server computer, storing an identifier associated with a secure controller that can access a crash memory area when the server computer is in an error state, and reserving the crash memory area in memory using Basic Input/Output System (BIOS), wherein the secure controller is a baseboard management controller positioned on a motherboard of the server computer;
    detecting the error state, and, using a processor of the server computer, storing error data in the crash memory area, wherein upon detecting the error state, an interrupt to the processor occurs that returns control to the BIOS;
    setting a flag, using the processor, to indicate to the secure controller that the crash memory area is ready to be copied;
    receiving a request, from the secure controller, to access the crash memory area, the request including the identifier; and
    using the secure controller to copy data from the crash memory area using a system bus memory transaction because the identifier in the request matches the stored identifier, wherein the BIOS restricts access to all areas of the memory except the crash memory area after detecting the error state.

2. The method of claim 1, wherein the system bus is a PCIe bus.

3. The method of claim 1, the setting of the flag includes setting a hardware pin on the processor.

4. The method of claim 1, wherein the system bus memory transaction is a Direct Memory Access transaction.

5. The method of claim 1, further including transmitting the data from the crash memory to an external server computer for analysis.

6. A method, comprising:
- detecting an error event in a processor on a computer;
- in response to the error event, initiating an interrupt that provides control to a Basic Input/Output System (BIOS);
- copying a state of registers in the processor to a crash memory area in a system address space on the computer in response to the error event; and
- transmitting an alert from the processor that the crash memory area is ready to read, wherein the crash memory area is accessible to a baseboard management controller, the BIOS and the processor, but all other memory areas are blocked after the error event.

7. The method of claim 6, further comprising:
- reserving the crash memory area using Basic Input/Output System (BIOS) during booting up of the computer and wherein the crash memory area is within Random Access Memory (RAM) or memory mapped I/O.

8. The method of claim 7, wherein the components that have access to the crash memory area include a baseboard management controller, the BIOS, and the processor, and wherein all other components are blocked from accessing the crash memory area.

9. The method of claim 6, further including reading the alert in a secure controller and, in response thereto, reading the crash memory area using a system bus of the computer.

10. The method of claim 6, wherein transmitting the alert includes setting an external pin on the processor.

11. The method of claim 6, further including storing, into the crash memory area, configuration parameters that are programmed into the processor during booting up of the server computer.

12. The method of claim 6, wherein the state of registers includes the state of configuration registers in the processor, machine check registers, and error and diagnostic information.

13. The method of claim 6, further including, in response to the alert, reading data from the crash memory area using a Baseboard Management Controller (BMC) over a PCIe system bus.

14. The method of claim 13, further including transmitting the data from the BMC to an external server computer.

15. An Integrated Circuit (IC), comprising:
- a management unit configured to read a state of registers in the IC when an error occurs and store the state of the registers in a crash memory area of a system address space;
- a memory controller within the IC that is configured to block access to the crash memory area except for requestors associated with identifiers matching one or more predetermined identifiers and
- a programmable logic device (PLD) between the management unit and the memory controller, wherein the PLD is configured to enable requests to read the crash memory area by the memory controller, but access to all other memory areas is restricted after the error occurs.

16. The IC of claim 15, further including an external pin on the IC, wherein the management unit is configured to set the external pin when the crash memory area is ready to be read.

17. The IC of claim 15, wherein the IC is a central processing unit for a server computer.

18. The IC of claim 17, wherein the IC is configured to allow access to the crash memory area from a baseboard management controller within the server computer after the error occurs.

19. The IC of claim 18, wherein the baseboard management controller is configured to read the crash memory area using Direct Memory Access (DMA) transactions on a system bus within the server computer.

20. The IC of claim 15, wherein the management unit is configured to store configuration parameters into the crash memory area that are programmed into the IC by Basic Input/Output System (BIOS).

* * * * *